Nov. 11, 1930.  E. A. FERRIS  1,781,221
DIFFERENTIAL TRUCK FOR SAWMILL CARRIAGES
Filed Oct. 15, 1928
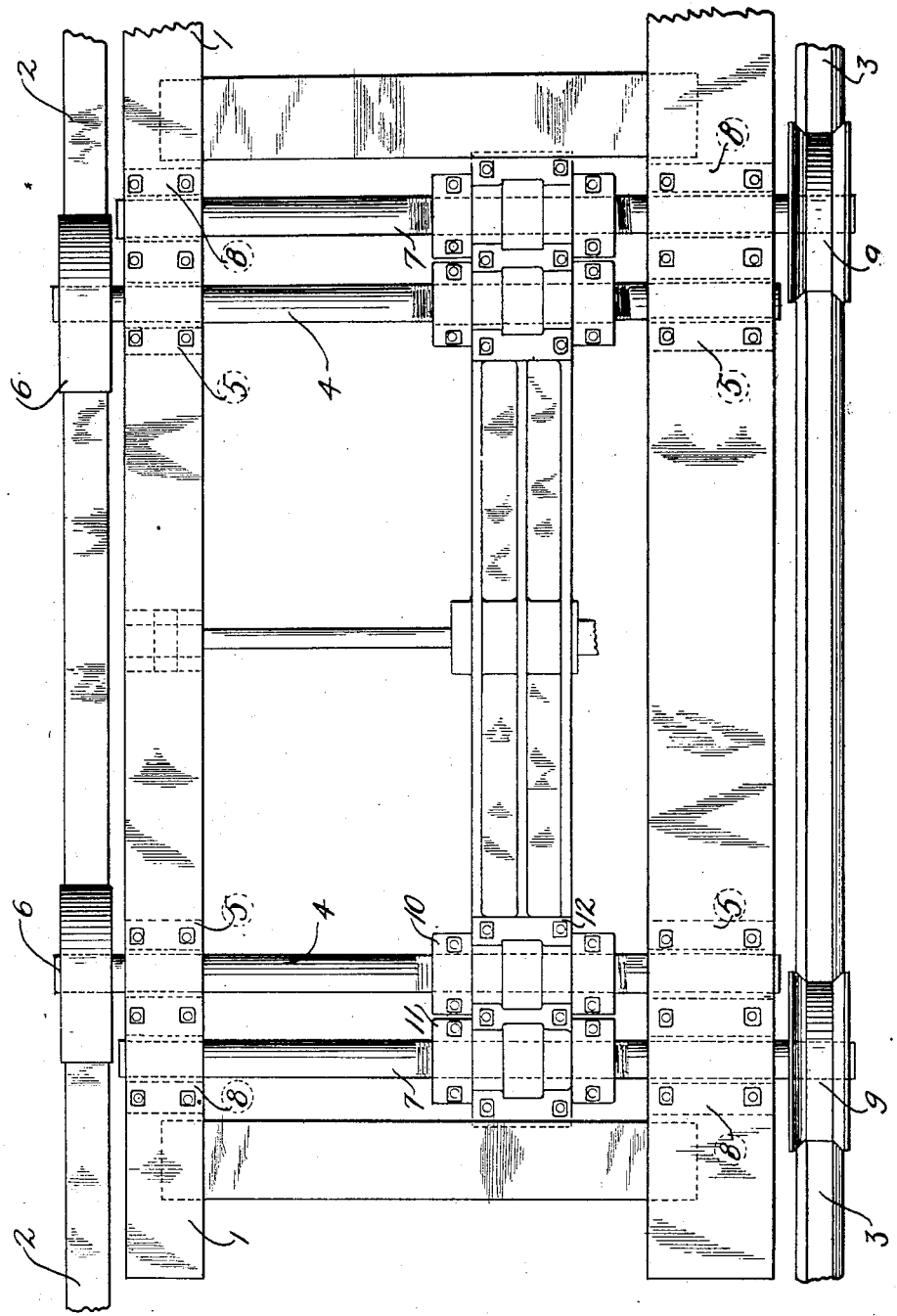
INVENTOR.
ERVIE A FERRIS
BY
ATTORNEYS.

Patented Nov. 11, 1930

1,781,221

UNITED STATES PATENT OFFICE

ERVIE A. FERRIS, OF WESTWOOD, CALIFORNIA

DIFFERENTIAL TRUCK FOR SAWMILL CARRIAGES

Application filed October 15, 1928. Serial No. 312,651.

My invention relates to improvements in a differential truck for sawmill carriages, and it consists in the combinations, constructions, and arrangements hereinafter described and claimed.

The standard sawmill carriage or truck is supported by axles, these axles carrying flat-faced wheels keyed to one end of the shaft, and V-shaped wheels keyed to the other end. The flat-faced wheels ride on a wide flat rail while the V-shaped wheels ride on a V-rail. The V-shaped wheels straddle the V-rail and are used for guiding the carriage along the track in a straight course.

It has been customary to make the outer diameter of the flat wheel equal to the diameter of the center of the V of the V-shaped wheel. Since both wheels are keyed to the axle, there will be a slippage of the flanges on the V-wheels with respect to the V-rail, because these flanges have a larger diameter than that of the flat wheels and will tend to traverse a greater distance while turning through the same number of revolutions. This causes wear upon the flat-faced wheels, and it is necessary to remove the trucks every few months and resize these wheels.

Whether or not the wheels are resized, the carriage will run hard, due to the differences in diameters between the two types of wheels. If the flat wheels wear and are not resized, they will have a tendency to deviate the truck from a straight line, which results in producing poor lumber.

The principal object of the present invention is to provide means for permitting the V-shaped wheels to rotate independently of the flat wheels.

This is accomplished by placing the wheels on separate axles. With this construction undue wear upon the wheels will be obviated, and as a result the lumber will be accurately cut, and it will be unnecessary to remove the trucks from time to time in order to resize the wheels.

Further objects and advantages will appear in the following specification, and the novel features of my invention will be particularly pointed out in what I hereinafter claim.

My invention is illustrated in the accompanying drawing forming a part of this application, in which The figure is a top plan view of the device.

In carrying out my invention, I make use of a sawmill carriage 1, a flat rail 2 and a guiding rail 3. Axles 4 are supported by bearings 5, and carry flat wheels 6. These wheels ride upon the rail 2.

Axles 7 are supported by bearings 8, and these carry V-shaped wheels 9 that ride upon the guide rail 3. The axles 4 and 7 are grouped close together so as to dispose the flat wheels almost directly opposite to the V-shaped wheels.

A carriage constructed in accordance with the above description will run straight, and it will take less power than is normally necessary to move the standard sawmill carriage truck. The truck will run longer without it being necessary to true up the wheels than is possible with the standard truck carriage.

It should be noted that the axles 4 and 7 are threaded into collars 10 and 11 respectively, these collars bearing against the opposite sides of a casting 12. This permits the axles to be adjusted for accommodating the trucks to tracks of different gauge.

It should further be noted that although the wheels 9 are of a larger diameter than the wheels 6, the larger wheels will not control the speed of travel, and there will also be no slippage between the wheels 6 and 9 and their respective rails.

Although I have shown and described one embodiment of my invention, it is to be understood that the same is susceptible of various changes and I reserve the right to employ such changes as may come within the scope of the invention as claimed.

I claim:

A differential truck comprising a frame, bearings carried by said frame, axles rotatably and slidably mounted in said bearings, wheels having V-shaped grooves and being mounted on certain of said axles, flat rimmed wheels mounted on the other axles and being disposed on the opposite side of the frame, a casting, means for rigidly positioning said casting with reference to said frame, and means for adjusting the axles relative to said casting.

ERVIE A. FERRIS.